(12) United States Patent
Mehne et al.

(10) Patent No.: US 7,111,608 B2
(45) Date of Patent: Sep. 26, 2006

(54) DEVICE FOR ADJUSTING THE LOADING MOTION OF THE INTAKE AIR IN INTERNAL COMBUSTION ENGINES

(75) Inventors: Georg Mehne, Wenzenbach (DE); Matthias Zentgraf, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/057,680

(22) Filed: Feb. 14, 2005

(65) Prior Publication Data

US 2005/0188950 A1    Sep. 1, 2005

(30) Foreign Application Priority Data

Feb. 19, 2004    (DE) .................. 10 2004 008 255

(51) Int. Cl.
*F02B 31/08* (2006.01)
*F02D 9/08* (2006.01)

(52) U.S. Cl. .................................................. 123/308

(58) Field of Classification Search ............... 123/302, 123/308, 336, 337, 442; 251/305

See application file for complete search history.

(56) References Cited

U.S. PATENT DOCUMENTS

| | | | | |
|---|---|---|---|---|
| 5,669,347 | A | * | 9/1997 | Cullen et al. ............... 123/306 |
| 5,718,202 | A | * | 2/1998 | Bentz et al. ................ 123/399 |
| 5,875,758 | A | * | 3/1999 | Fujita ......................... 123/336 |
| 6,435,473 | B1 | * | 8/2002 | Dall'Osso et al. ..... 251/129.11 |
| 6,655,348 | B1 | * | 12/2003 | Jessberger et al. .......... 123/308 |
| 6,763,582 | B1 | * | 7/2004 | Kaiser et al. ................. 29/854 |
| 6,782,872 | B1 | * | 8/2004 | Moschini et al. ........... 123/470 |
| 2002/0108601 | A1 | * | 8/2002 | Dietz et al. ................. 123/336 |
| 2002/0179030 | A1 | * | 12/2002 | Fiesel et al. ........... 123/184.42 |

* cited by examiner

*Primary Examiner*—Hai Huynh
(74) *Attorney, Agent, or Firm*—Baker Botts L.L.P.

(57) ABSTRACT

A device for adjusting the loading motion of the intake air in internal combustion engines comprises a housing, which can be connected between an intake module and a cylinder head of an internal combustion engine, the surface of the housing facing the intake module having at least a first opening with a first inlet channel for a cylinder of the internal combustion engine and at least a second opening with a second inlet channel for the same cylinder of the internal combustion engine. Each second opening is provided with a helical valve that can be controlled by an actuator.

14 Claims, 2 Drawing Sheets

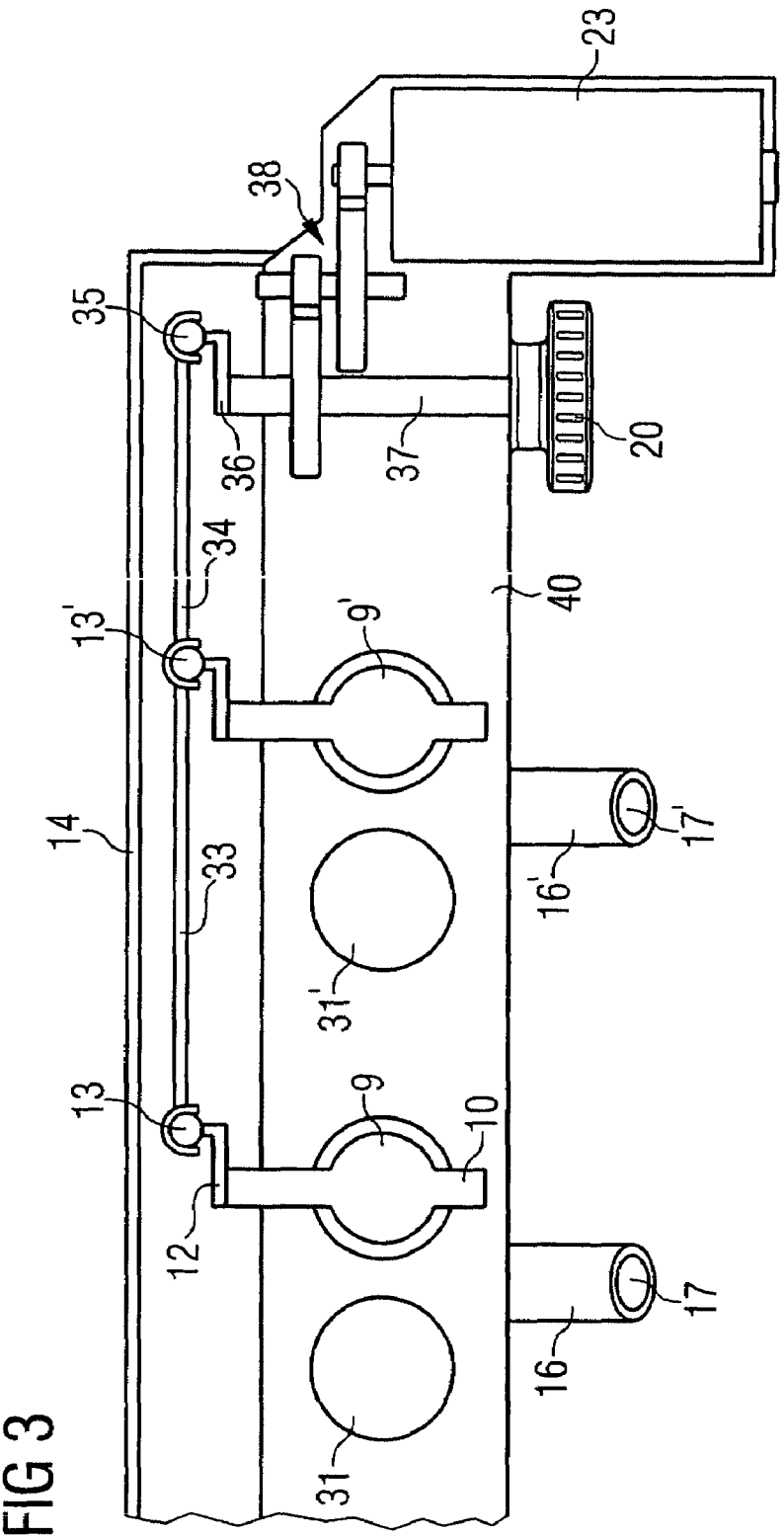

DEVICE FOR ADJUSTING THE LOADING MOTION OF THE INTAKE AIR IN INTERNAL COMBUSTION ENGINES

PRIORITY

This application claims priority to German application number DE 10 2004 008 255.3 filed Feb. 19, 2004.

FIELD OF THE INVENTION

The invention relates to a device for adjusting the loading motion of the intake air over the entire load area in internal combustion engines, in particular in a petrol engine with intake manifold injection.

BACKGROUND OF THE INVENTION

Helical valves are generally used to modify the loading motion of the intake air and these are incorporated in the intake module perpendicular to the inward flow direction. A cover is fitted to protect the helical mechanism. An actuator with electrical contacts is attached to the cover to activate the helical valves. The injection elements or injectors must be controlled and attached separately.

Such known devices have the disadvantage that they have a lot of individual parts. This involves a high level of assembly outlay and can also result in incorrect assembly. The separate contacting of the actuator and injectors is similarly disadvantageous, as two interfaces have to be connected.

SUMMARY OF EMBODIMENTS OF THE INVENTION

The object of the invention is to propose a device for adjusting the loading motion of the intake air in internal combustion engines, which reduces the risk of the failure of intake modules due to incorrect assembly.

According to the invention the device for adjusting the loading motion of the intake air in internal combustion engines can comprise a housing, which can be connected between an intake module and a cylinder head of an internal combustion engine. The surface of the housing facing the intake module can have at least a first opening with a first inlet channel for a cylinder of the internal combustion engine and at least a second opening with a second inlet channel for the same cylinder of the internal combustion engine. Each second opening is provided with a control valve that can be controlled by an actuator.

The arrangement of the device between the intake module and the cylinder head is particularly advantageous, as it allows a compact structure. The high level of component integration reduces assembly costs and storage costs.

It has proven advantageous to arrange the actuator in the housing. This means that the seals required for a separately mounted actuator are no longer necessary.

In a further advantageous embodiment of the invention a plurality of helical valves can be connected together by means of at least one coupling rod, which is arranged in the housing. The actuator can thereby drive the coupling rod via a transmission unit. Instead of a direct drive, this offers the possibility of adjusting all the helical valves synchronously via a single actuator.

It has proven very advantageous to form the flange of the intake module as a complementary housing cover. The flange of the intake module then provides the covering function and sealing is also simplified.

In a further advantageous embodiment the first and second inlet channels converge at the connecting surface facing the cylinder head for an internal combustion engine with single valve technology. For internal combustion engines with multiple valve technology it is advantageous to guide the first and second inlet channels on the connecting surface facing the cylinder head.

It has also proven advantageous to arrange the fuel module holder on the housing as well, each fuel module holder having a magnet coil to control a fuel module and an associated line frame being present for electrical contact with the magnet coils in the housing. It is particularly advantageous in automobile manufacture, as only a single module has to be mounted onto the cylinder head. This means that all the functions such as helical valves and injectors are added to the engine in a single work step.

It is also advantageous to combine the contacts of the actuator and the line frame in a single electrical plug connection on the outside of the housing. The fitter only has to connect one plug connection instead of two.

BRIEF DESCRIPTION OF THE DRAWINGS

The invention is described in more detail below with reference to the schematic drawing, in which:

FIG. 3 shows a top view of the device according to the invention without cover with closed helical valve.

DETAILED DESCRIPTION OF EMBODIMENTS OF THE INVENTION

Figure 1:
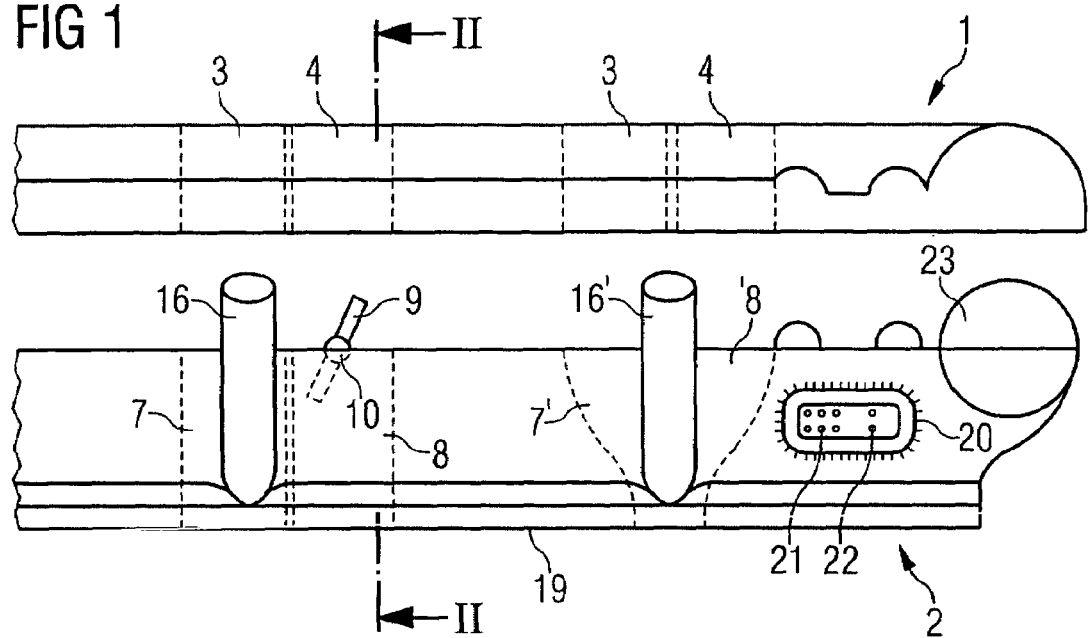
FIG. 1 shows a side view of a device according to the invention plus cover with open helical valve.
Figure 2:
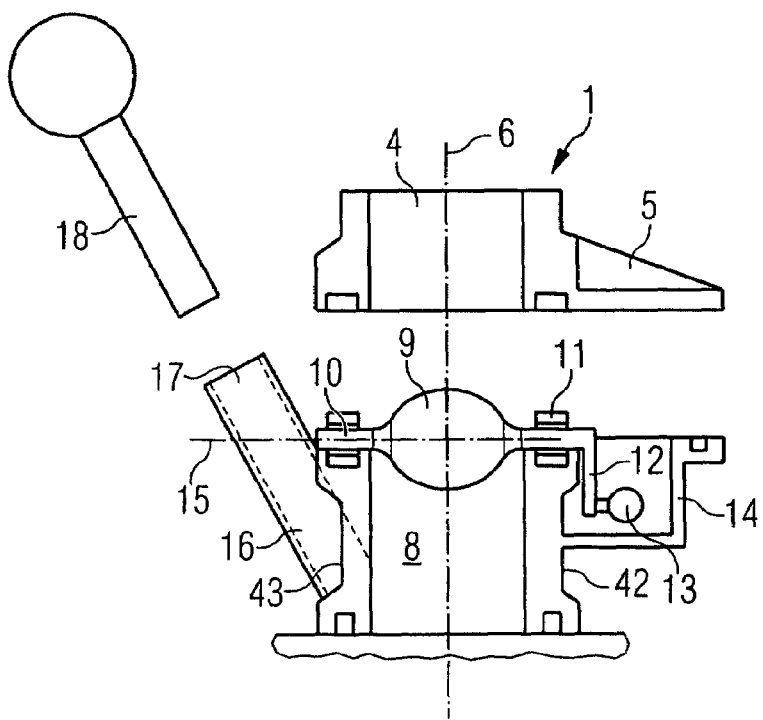
FIG. 2 shows a section along the second inlet channel with open helical valve.

FIG. 1 shows a device for adjusting the loading motion of the intake air in internal combustion engines. In this exemplary embodiment the device according to the invention has a cover 1 and a housing 2 formed in a complementary manner to this. Cylindrical inlet holes 3 are formed in said cover with second inlet holes 4 parallel to them. The section shown in FIG. 2 through the second inlet hole shows that a coupling covering 5 is formed perpendicular to the inlet hole axes 6 at the side of the cover 1.

The device according to the invention shown in FIGS. 1 and 3 is for example designed solely for a two-cylinder engine. The device according to the invention can be tailored to the number of cylinders in the engine. It is also possible to tailor it for multiple valve technology or single valve technology. An embodiment for a multiple valve engine is shown on the left side of the housing 2. In contrast, an exemplary embodiment for a single valve engine is shown on the right side. In the first example the first inlet channels are separate. In the second example the inlet channels converge. The cover 2 for the multiple valve embodiment has a first inlet channel 7 and a second inlet channel 8. In the upper area of the cover 2 within the second inlet channel 8 is an open helical valve 9. The shaft 10 rests the peripheral region of the second inlet channel 8. The shaft 10 is supported in ball bearings 11. At one free end of the shaft 10 a lever 12 is formed perpendicular to said shaft, having a section of a spherical head joint 13 parallel to the axis of the shaft 15. The lever 12 and the spherical head 13 are located in a recess 14 formed at the side of the cover 2. Two fuel module holders 16, 16' at an oblique angle to the side wall 43 of the cover 2 are formed on this side wall 43, which is opposite the side wall 42 having the recess 14. The cylindrical module holders 16, 16' have a cylindrical hole 17, 17', which opens into the corresponding inlet channel. The holder 17 serves to hold the fuel module 18, in particular an injector.

The embodiment for single valve technology is shown on the right side of FIG. 1. In contrast to the embodiment for multiple valve technology, the inlet channels 7' converge at the lower end or at the connecting surface 19 of the cover 2. With this exemplary embodiment the associated helical valve was omitted for the purpose of simplification. On the right next to the fuel module holder 16', which opens into the converged area of the two inlet channels 7', 8', is a plug connection 20 with first contacts 21 and second contacts 22. Magnet coils (not shown) are let into the fuel module holder 16, 16', in order to be able to control the injectors correspondingly. The electrical connection between the magnet coils and the first electrical contacts 21 is provided by a line frame, also let into the cover 2. The second electrical contacts 22 are connected to an actuator, in particular a direct current motor, this direct current motor also being arranged in the cover 2.

FIG. 3 shows a top view of the cover 2 shown in FIG. 1, the two helical valves being shown in the closed position. The first inlet channels 7, 7' have a first opening 31, 31'. The second inlet channel 8, 8' correspondingly has a second opening 32, 32'. The helical valves 9 are located in these second openings 32, 32'. As can be seen, the helical valve 9 does not have to seal the corresponding second opening completely. It is sufficient to minimize flow conditions to a specific degree. The two helical valves are connected mechanically to each other via a coupling rod 33. The coupling rod 33 is thereby pushed onto the respective spherical heads 13, 13'. This coupling rod 33 is extended by a further coupling rod 34 onto a head 35. This head 35 is formed on a lever 36. This lever is in turn formed in a perpendicular manner on a drive rod 37, which can be driven by the direct current motor 23 via a transmission unit 38.

A direct drive is also possible, so that each helical valve has its own drive.

This device according to the invention allows a highly compact module to be achieved, containing the entire helical mechanism as well as the support for the injectors and the injector actuators.

What we claim is:

1. A device for adjusting the loading motion of intake air in internal combustion engines, said device comprising:
    a housing-cover assembly adapted to be connected between an intake module and a cylinder head of an internal combustion engine, the housing-cover assembly including a housing and a cover, the cover including multiple pairs of first and second openings, wherein for each pair of openings, said first opening is associated with a first inlet channel for a cylinder of the internal combustion engine, and said second opening is associated with a second inlet channel for the same cylinder of the internal combustion engine;
    a plurality of helical valves that can be controlled by an actuator, each helical valve located in one of the second openings;
    a plurality of valve shafts coupled to the plurality of helical valves, each valve shaft mounted between the housing and the cover such that attachment of the cover to the housing secures the valve shaft in place; and
    at least one coupling rod operable to be controlled by the actuator to rotate the valve shafts to control the helical valves, the at least one coupling rod being substantially enclosed within a chamber defined between an extension of the housing and an extension of the cover.

2. A device according to claim 1, wherein the actuator is arranged in the housing-cover assembly.

3. A device according to claim 1, wherein the at least one coupling rod is arranged.

4. A device according to claim 3, wherein a transmission unit is mechanically connected between the actuator and the at least one coupling rod.

5. A device according to claim 1, wherein the cover includes inlet holes oriented towards the inlet channels.

6. A device according to claim 1, wherein at least one pair of first and second inlet channels converge at a surface facing the cylinder head.

7. A device according to claim 1, wherein at least one pair of first and second inlet channels are separate at a surface facing the cylinder head.

8. A device according to claim 1, further comprising a fuel module holder arranged on the housing such that a hole in the fuel module holder opens into one of the inlet channels.

9. A device according to claim 8, wherein the fuel module holder has a magnet coil to control a fuel module, and a line frame for electrical contact with the magnet coil in the housing.

10. A device according to claim 9, further comprising an electrical plug connection having electrical contacts formed on the outside of the housing, said contacts electrically connected to the line frame and the actuator.

11. A device according to claim 1, wherein:
    the extension of the housing forms a recess;
    the extension of the cover comprises a flange; and
    in an assembled state of the housing-cover assembly, the flange and recess form the chamber in which the at least one coupling rod is substantially enclosed.

12. A device according to claim 1, wherein:
    the multiple pairs of first and second openings are aligned in a row extending in a first direction;
    each valve shaft extends in a second direction generally perpendicular to the first direction; and
    the at least one coupling rod extends generally in the first direction.

13. A device according to claim 1, wherein:
    the housing includes a plurality of housing notches;
    the cover includes a plurality of cover notches; and
    at least one end of each valve shaft is secured between one of the housing notches and one of the cover notches.

14. A device according to claim 1, wherein:
    the housing includes a housing notch;
    the cover includes a cover notch; and
    a ball bearing for facilitating rotation of one of the valve shafts is secured between the housing notch and the cover notch.

* * * * *